(12) United States Patent
Kuo

(10) Patent No.: US 6,974,941 B2
(45) Date of Patent: Dec. 13, 2005

(54) METHOD AND APPARATUS FOR MEASURING PERFORMANCE OF A LAMP

(75) Inventor: Chien-Fong Kuo, Tao-Yuan Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 10/711,065

(22) Filed: Aug. 20, 2004

(65) Prior Publication Data

US 2005/0040314 A1 Feb. 24, 2005

(30) Foreign Application Priority Data

Aug. 20, 2003 (TW) .............................. 92122822 A

(51) Int. Cl.⁷ ................................................ G01J 1/32
(52) U.S. Cl. ........................................ 250/205; 445/63
(58) Field of Search ............................ 250/205, 208.1; 445/63; 315/364; 324/403; 353/85

(56) References Cited

U.S. PATENT DOCUMENTS

| | | | | |
|---|---|---|---|---|
| 4,509,077 A | * | 4/1985 | Therrien ...................... 348/187 |
| 5,153,745 A | * | 10/1992 | Brandkamp et al. ........ 358/406 |
| 5,978,614 A | * | 11/1999 | Takeuchi ...................... 399/32 |
| 2003/0075687 A1 | * | 4/2003 | Suzuki et al. ............. 250/458.1 |

* cited by examiner

*Primary Examiner*—David Porta
*Assistant Examiner*—Seung C. Sohn
(74) *Attorney, Agent, or Firm*—Winston Hsu

(57) ABSTRACT

A light source testing system includes a light source to form an image, an image capturing apparatus capturing the image by a plurality of pixels, and an image processing apparatus calculating a plurality of gray levels of the plurality of pixels to determine a characteristic parameter of the light source.

7 Claims, 5 Drawing Sheets

METHOD AND APPARATUS FOR MEASURING PERFORMANCE OF A LAMP

BACKGROUND OF INVENTION

1. Field of the Invention

The present invention relates to a method and an apparatus for testing a lamp, and more specifically, to a method and an apparatus for measuring the performance of a lamp.

2. Description of the Prior Art

Digital projector (e.g. LCD digital projector or DLP digital projector), like a typical projector or a slide projector, uses a high brightness lamp to project images onto a screen. Digital projector includes optical devices to control the projection, and each of them would influence the quality of the projection. The lamp is the most influential because it is a light source for forming an image. A lamp with bad performance (e.g. brightness and uniformity) may cause bad quality of image projection.

As known by the industry, the lamp is composed of a burner and a reflector, and the relative position of the burner and the reflector affects the brightness and uniformity of the lamp. Generally, the lamp is tested by using an integrating sphere to calculate the light flux of the lamp. The larger the light flux is, the brighter the lamp is and the better the performance is. However, two lamps having the same light flux may lead to different image quality when respectively used in the same digital projector. Because when the lamp is installed in the digital projector, the light generated by the lamp outputs through an aperture, and only the light passing through the aperture contributes to the image formation. As it is mentioned above, the integrating sphere calculates the light flux of the lamp, but the projector utilizes only a portion of the light generated by the lamp. In other words, even if the two lamps have the same light flux calculated by the integrated sphere, each brightness and uniformity may be different, so that the digital projector using the lamps may project images in different quality.

For the manufacturer of lamp, lamp testing is mainly measuring lamp brightness by using the integrated sphere, which does not provide a reliable means to measure the real performance of the lamp. No other characteristics can be provided to adjust the relative position of the burner and the reflector of the lamp for a better and a uniform performance. In addition, the manufacturer of the digital projector can only require the manufacturer of the lamp for lamps with predetermined light flux. When testing the digital projector, a tester measures the brightness and uniformity of image projection only by the naked eye without an objective measurement to rank the brightness and uniformity of the lamp, so that reliable measured values cannot be obtained to select the lamps, and the qualities of the digital projectors will be all different due to the unstable qualities of the lamps.

SUMMARY OF INVENTION

It is therefore one of the objectives of the present invention to provide a method and an apparatus for measuring performance of a lamp to solve the problems mentioned above.

Briefly summarized, a light source testing system includes a light source for generating a light to form an image, an image capturing apparatus for capturing an image occupying a plurality of pixels of the image capturing apparatus, and an image processing apparatus for calculating a plurality of gray levels of the plurality of pixels and calculating a characteristic parameter of the light source according to the plurality of gray levels.

The present invention further provides a light source testing method including (a) providing a light source for forming an image, (b) using an image capturing apparatus for capturing an image occupying a plurality of pixels of the image capturing apparatus, and (c) using an image processing apparatus for calculating a plurality of gray levels of the plurality of pixels and calculating a characteristic parameter according to the plurality of gray levels.

The present invention provides a method to capture an image generated by a lamp through an aperture, and process the image by an image processing program to calculate a first parameter representing hot spot deviation, a second parameter representing light concentration, a third parameter representing image ring deviation from an ideal circle, and a fourth parameter representing an average gray level of the image, and then measure the performance of the lamp by the first, second, third and fourth parameters.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
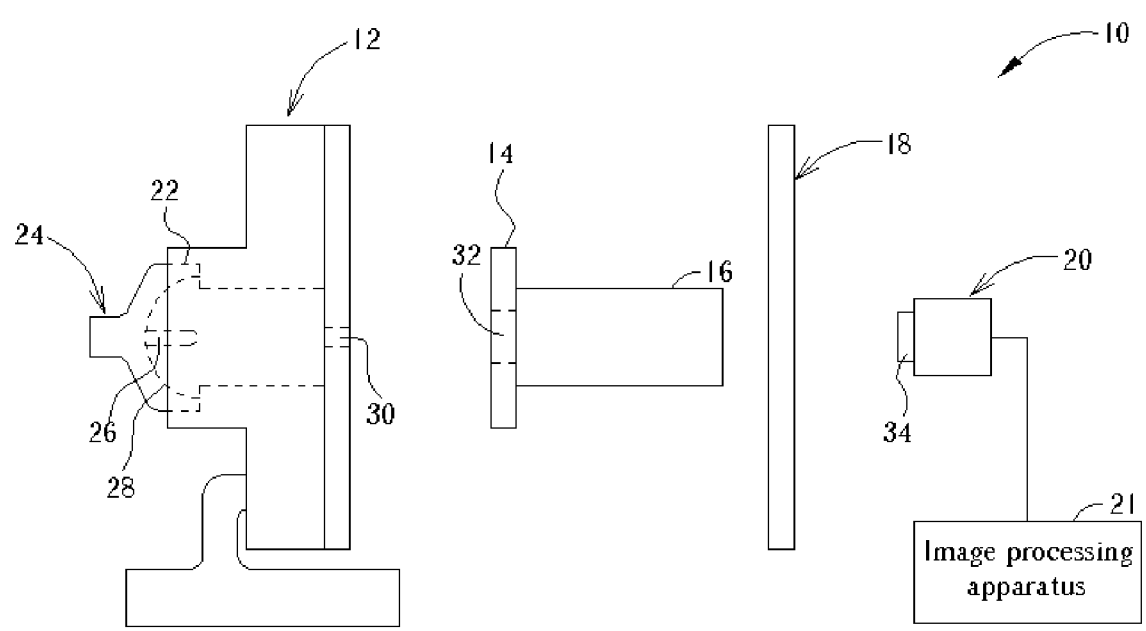
FIG. 1 illustrates a lamp testing system according to the present invention.

Please refer to FIG. 1 showing a lamp testing system 10 according to the present invention. The lamp testing system 10 includes a lamp clamping apparatus 12, a shading plate 14, an image forming lens 16, a screen 18, an image capturing apparatus 20 (e.g. a CCD photosensor or a CMOS photosensor), and an image processing apparatus 21 (e.g. a computer system). The lamp clamping apparatus 12 includes a fixing recess 22 for fixing a lamp 24 to be measured. The lamp 24 includes a burner 26 and a reflector 28. The lamp clamping apparatus 12 includes an aperture 30 in any kind of shape (e.g. 6.3 mm*3.9 mm rectangle) for simulating an aperture in a digital projector. When providing a stable power to the lamp 24, the light generated by the lamp 24 will output through the aperture 30. The aperture 30 can also be filled with a transparent element (e.g. a piece of transparent glass, not shown in the figure) to filter the light from the lamp 24. When testing the lamp 24, in order to prevent unnecessary light interference, the shading plate 14 with a hole 32 is used to shade unnecessary light from the environment, and an image is projected onto the screen 18 in the same shape as the aperture 30 through the image forming lens 16. The present embodiment uses a semitransparent material for the screen 18, such as an acrylic plate grinded by a sand paper. Since the screen is semitransparent, the light output by the image forming lens 16 can form an image on the screen 18, that is, the present embodiment uses the image forming lens 16 and the screen 18 as an image forming apparatus to project the light generated by the lamp 24 onto the screen 18. In addition, the image capturing apparatus 20 behind the screen 18 captures the image on the screen 18 by a plurality of pixels the image occupying and the image processing apparatus 21 calculates the gray levels of the pixels for generating corresponding image data. The reason to put the image capturing apparatus 20 behind the screen 18 instead of on a side of the screen 18 is because the captured images will not distort. The image processing apparatus 21 can execute an image processing program to process the image data.

The image capturing apparatus 20 converts light flux into inducing voltage. If the incident light of the image capturing apparatus 20 is too bright, the image capturing apparatus 20 will make each pixel correspond to a saturated inducing voltage, that is, each pixel corresponds to a maximum gray level (e.g. 255). In other words, the image processing apparatus 21 cannot distinguish brightness differences between pixels. Therefore, the present embodiment uses the semitransparent screen 18 and a filter 34 to reduce the intensity of the light incident on the image age capturing apparatus 20 from the lamp 24. For instance, the semitransparent screen 18 reduces the intensity of the incident light to 50%, and the filter 34 (e.g. a conventional neutral density filter) further reduces the intensity to 10%. If the brightness of the lamp 24 is 10000 nit, the light generated by the lamp 24 becomes 5000 nit after passing through the screen 18, further becomes 500 nit after passing through the filter 34. Such arrangement can limit the gray level of each pixel in a predetermined range (e.g. 0–255), so that the image processing apparatus 21 can distinguish light differences between the pixels.

Additionally, the present embodiment can also adjust the intensity of the incident light by setting up the gain of the image capturing apparatus 20. For instance, the image capturing apparatus 20 receives a ray and convert the light flux of the ray into an inducing voltage, and an analog-to-digital converter converts the inducing voltage into a corresponding gray level.

If the screen 18 and the filter 34 do not have a good performance on reducing light intensity, the inducing voltage will exceed an upper limit of the inducing voltage of the image capturing apparatus 20. So that when the inducing voltage exceeds the upper limit, the image capturing apparatus 20 will convert the inducing voltage into the maximum gray level (e.g. 255). Therefore, if the image capturing apparatus 20 receives a first light flux and a second light flux both exceeding the upper limit in sequence, the image capturing apparatus 20 will output the maximum gray level so that the first light flux and the second light flux cannot be distinguished. In this case, the present embodiment adjusts the gain of an amplifier to calibrate the original inducing voltage, that is, to reduce the original inducing voltage in a predetermined proportion to supplement the reduction by the screen 18 and the filter 34 in order to keep the adjusted inducing voltage in the range mentioned above. In other words, when the first light flux and the second light flux are reduced in the range of inducing voltage, the image capturing apparatus 20 can output a corresponding gray level (0–255 in this embodiment) to distinguish the first light flux and the second light flux.

On the contrary, if the screen 18 and the filter 34 over-reduce the intensity, the inducing voltage will be lower than a lower limit of the inducing voltage of the image capturing apparatus 20. So that when the inducing voltage is lower than the lower limit, the image capturing apparatus 20 will convert the inducing voltage into the minimum gray level 0. Therefore, if the image capturing apparatus 20 receives a first light flux and a second light flux which are both lower than the lower limit in sequence, the image capturing apparatus 20 will output the minimum gray level so that the first light flux and the second light flux cannot be distinguished. In this case, the present embodiment adjusts the gain of the amplifier to calibrate the original inducing voltage, that is, to increase the original inducing voltage in a predetermined proportion to supplement the reduction by the screen 18 and the filter 34 in order to keep the adjusted inducing voltage in the range mentioned above. In other words, when the first light flux and the second light flux are increased in the range of inducing voltage, the image capturing apparatus 20 can output a corresponding gray level (0–255 in this embodiment) to distinguish the first light flux and the second light flux. As a result, the present embodiment keeps the light captured by the image capturing apparatus 20 in a range possible to be captured by the image capturing apparatus 20, by the transparent screen 18 and the filter 34 installed on the image capturing apparatus 20, and by setting up the gain of the image capturing apparatus 20.

Figure 2:
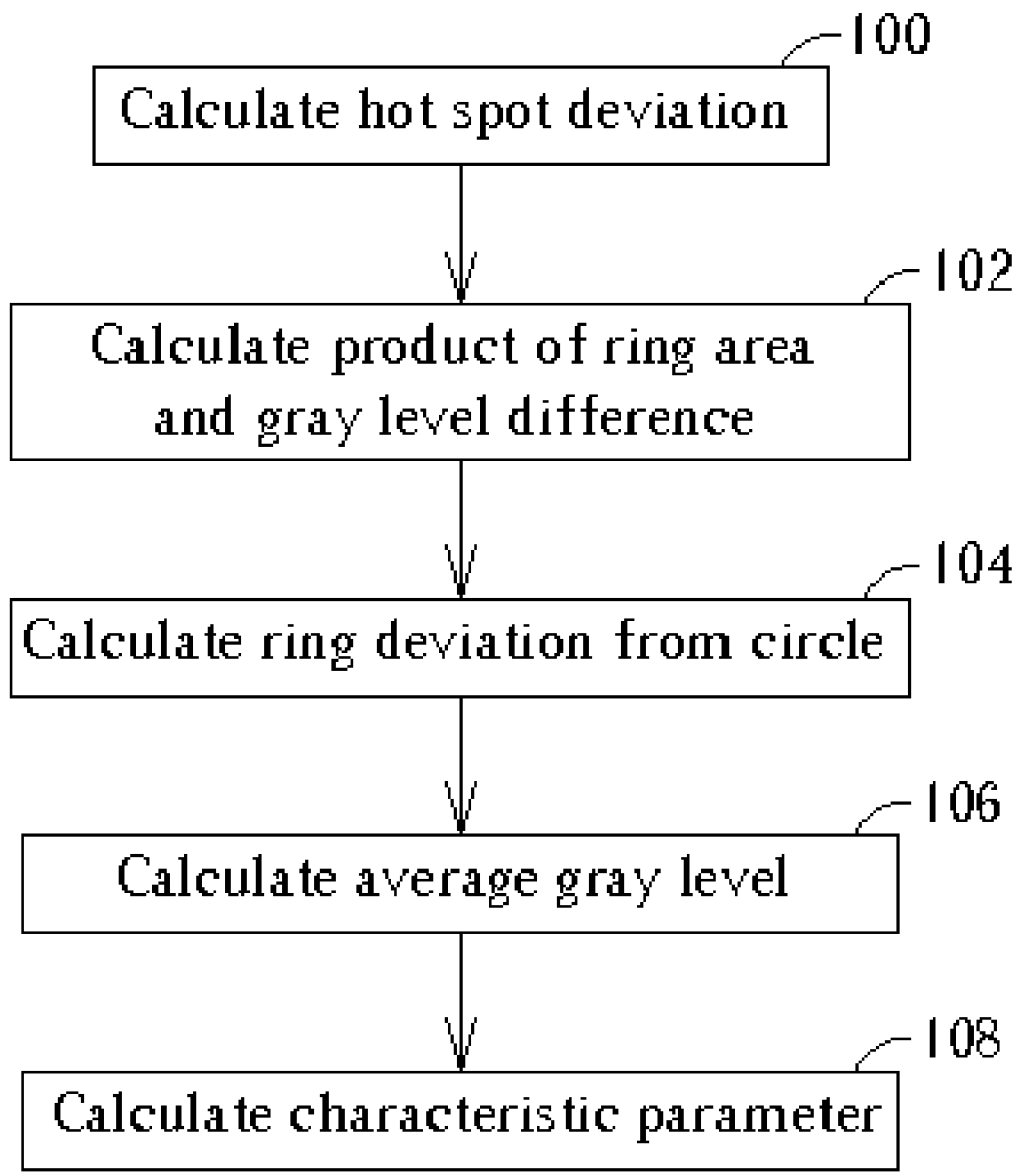
FIG. 2 is a flowchart of the method for measuring performance of the lamp according to the present invention.

Please refer to FIG. 2. FIG. 2 shows a flowchart of the method for measuring performance of the lamp according to the present invention. The present embodiment analyzes the performance of the lamp 24 (brightness and uniformity) by processing images captured by the image capturing apparatus 20, which is described as follows:

Step 100: Calculate the deviation of a hot spot of the image;

Step 102: Calculate a product of an area and a difference between the predetermined gray level and the maximum gray level; wherein the area is within a ring having gray levels larger than a predetermined gray level;

Step 104: Calculate the deviation of the above ring from a circle;

Step 106: Calculate an average gray level of the image; and

Step 108: Calculate a characteristic parameter of the lamp.

Figure 3:
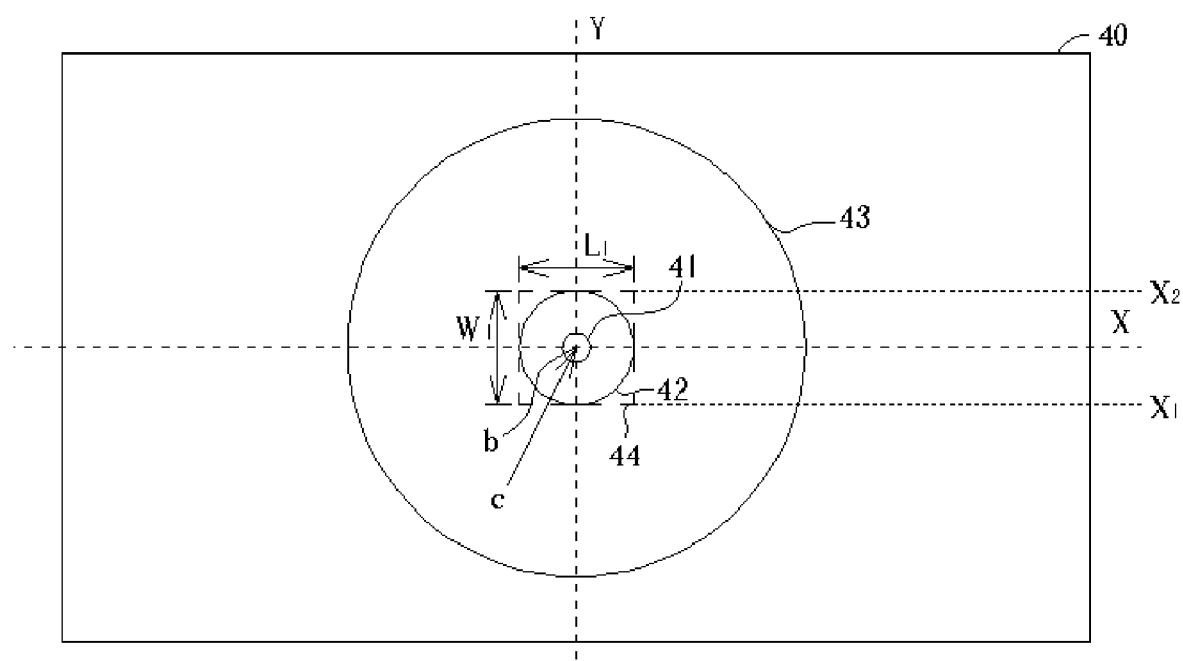
FIG. 3 illustrates an image captured by the image capturing apparatus installed with lamp A according to the present invention.
Figure 4:
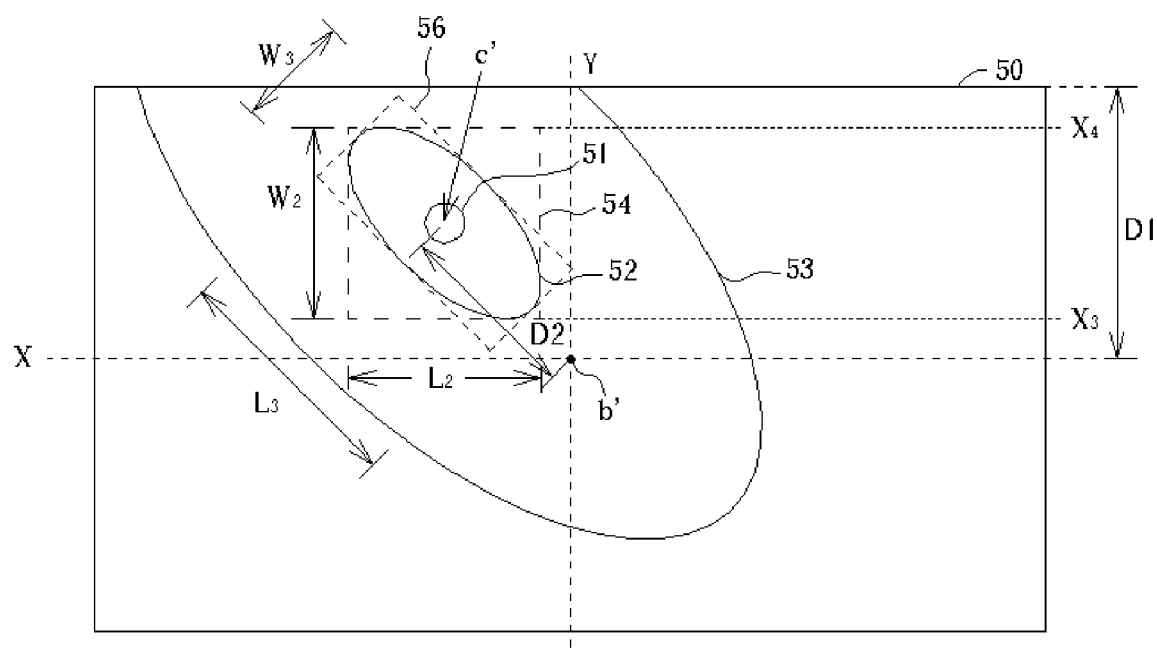
FIG. 4 illustrates an image captured by the image capturing apparatus installed with lamp B according to the present invention.

The steps mentioned above are described as follows. Assume that the lamp testing system 10 in FIG. 1 is used for testing an ideal lamp A and a typical lamp B. Please refer to FIG. 3 showing an image 40 captured by the image capturing apparatus 20 installed with lamp A, and FIG. 4 showing an image 50 captured by the image capturing apparatus 20 installed with lamp B. In FIG. 3, a ring 41 is the hot spot of lamp A, which is the brightest part near the center of lamp A. A ring 42 is the maximum brightness area of the lamp A, which is composed of neighboring pixels with the same predetermined gray level G. Similarly in FIG. 4, a ring 51 is the hot spot of lamp B, which is the brightest part near the center of lamp B. A ring 52 is the maximum brightness area of the lamp B, which is composed of neighboring pixels with the same predetermined gray level G. Rings 43 and 53 are composed of pixels in different brightness. The images 40 and 50 are generated respectively by lamp A and lamp B and captured by the same image capturing apparatus 20. The shape of image on the screen 18 is related to the aperture 30. In this embodiment, the aperture 30 is rectangular. When the lamp 24 is clamped by the lamp clamping apparatus 12, the position of the burner 26 corresponds to the position of the aperture 30, so that in FIG. 3 and FIG. 4, the intersection point of axis X and axis Y corresponds to the center of the aperture 30. In other words, the intersection point of axis X and axis Y is the center b and b' of the image 40 and 50.

The image processing program analyzes the gray level of each pixel in the image 40 and the image 50, and finds pixels having the maximum gray level to determine the center of the light source, and finds pixels having the same predetermined gray level G to determine a maximum brightness area (Step 100). In this case, the hot spot is brightest part near the center of the image. The maximum brightness area is formed by neighboring pixels having the same predetermined gray level G. The center of the light source c is generally the center of the hot spot as well as the center of the maximum brightness area.

In case of lamp A, since lamp A is an ideal lamp, the center of the light source c is very close to the intersection point of axis X and axis Y, which is the center of the image b.

As shown in FIG. 4, the center b' of the image 50 is at a distance of D1 from the edge of the image, the center of the light source c' deviates from the center of the image b' for a distance D2, and D2/D1 represents the deviation of the hot spot. Please notice that when the screen 18 is moved toward or backward the image forming lens 16, the image 50 on the screen 18 will change in size. However, even if the image 50 changes in size, the gray level of each pixel substantially will not change so that the position of the hot spot will not change, either. In other words, when the screen 18 is moved from the image forming lens 16, the image 50 will be enlarged proportionally. That is, D2 will be longer-ed proportionally as well. Similarly, a predetermined length (e.g. D1) in the image 50 will be longer-ed in the same proportion, too. Therefore, however the size of the image 50 changes, D2/D1 will not change as well, so that the present embodiment calculates a center deviation (i.e. D2/D1) for a first parameter representing the deviation of the hot spot.

In addition, a second parameter representing the brightness and uniformity of the lamp can be set up by calculating the area of the maximum brightness area and the gray level difference of the maximum brightness area. As shown in FIG. 3 and FIG. 4, the area Q surrounded by the ring 42 is smaller than the area Q' surrounded by the ring 52. Since the ring 42 is the maximum brightness area of lamp A, and the ring 52 is the maximum brightness area of lamp B, lamp B is brighter because it forms a larger area on the screen 18. However, besides the previously mentioned area, the distribution of the gray level should be considered too.

Figure 5:
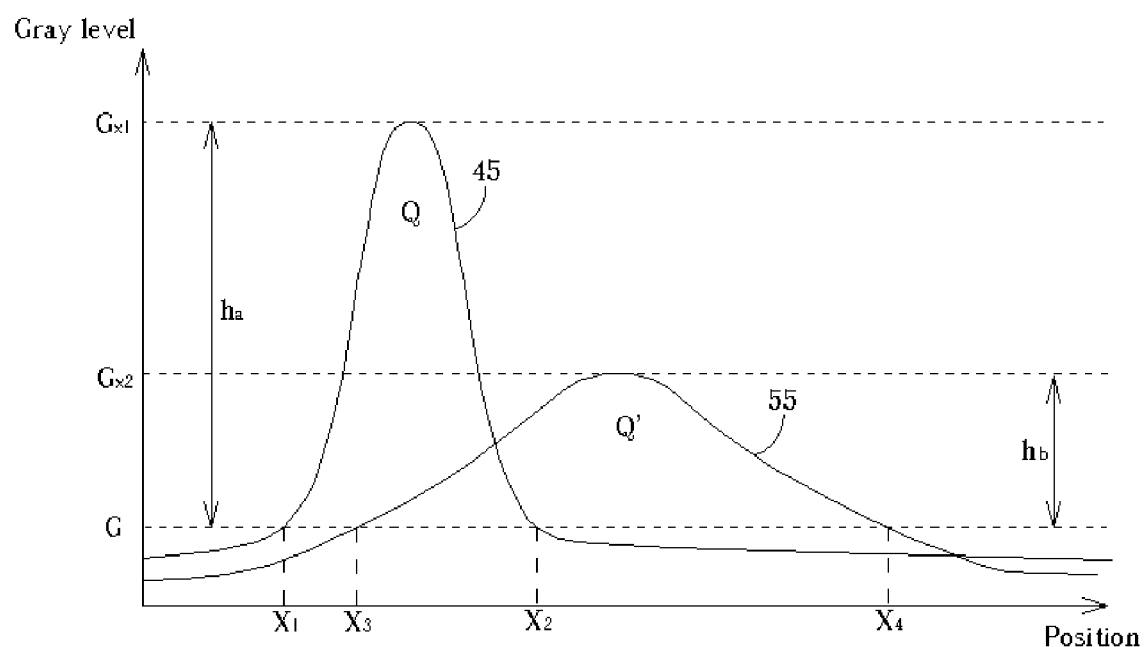
FIG. 5 illustrates the distribution of the gray level of the image in FIG. 3 and FIG. 4.

Please refer to FIG. 5 showing the distribution of the gray level of the image in FIG. 3 and FIG. 4. The horizontal axis represents the position of the image 40, 50, and the vertical axis represents the gray level of the pixels in different position. As shown in FIG. 5, a characteristic curve 45 represents the gray level of the pixels in different position on the X-axis in FIG. 3, and a characteristic curve 55 represents the gray level of the pixels in different position on the X-axis in FIG. 4. As shown by the characteristic curves 44, 45, pixels having gray level over a predetermined value G lie between x1-x2 on the X-axis in FIG. 3, pixels having gray level over a predetermined value G lie between x3-x4 on the X-axis in FIG. 4, and x3-x4 is larger than x1-x2. As shown in the figure mentioned above, the area Q' of the maximum brightness area of lamp B is larger than the area Q of the maximum brightness area of lamp A.

The maximum gray level GX1 formed by lamp A in the image 40 is larger than the maximum gray level GX2 formed by lamp A in the image 50, thus the gray level difference ha=GX1−G of the maximum brightness area of lamp A is larger than the gray level difference hb=GX2−G of the maximum brightness area of lamp B. Therefore, simply comparing the characteristic curves 45, 55, lamp A forms a denser gray level distribution in image 40.

In summary, the present embodiment uses the predetermined gray level G to calculate the area Q of the pixels having gray levels over the predetermined gray level G, as well as the gray level difference h of the maximum gray level and the predetermined gray level in the area, and then calculate the product V of the area Q and the gray level difference h, in order to represent light concentration on the screen 18 (Step 102). In other words, the present embodiment utilizes the second parameter (V=Q*h) to represent light concentration. Please notice that since the characteristics of lamp A and lamp B do not change, the gray level for calculating the area of the image is adjustable. For instance, another gray level G' can be used to calculate the area and the gray level difference.

As mentioned above, the relative position of the burner 26 and the reflector 28 has an influence on the characteristic of the lamp 24. In general, the less the deviation from a circle of the ring formed by the pixels having the same gray level is, the more uniform the gray levels of the pixels are, that is, the better the performance of the lamp 24 is. Therefore, the present invention calculates a third parameter representing the deviation of the ring from an ideal circle (Step 104), in order to check the characteristics of the lamp 24.

Since the present embodiment uses the predetermined gray level G to calculate light concentration of the image 40 and 50, the present embodiment calculates a plurality of rectangles each with four sides tangent with the rings 42 and 52 to check how the rings 42 and 52 deviate from a circle. In case of the ring 42 in FIG. 3, a rectangle 44 is L1 in length on X-axis and W1 in width on Y-axis. The closer to a circle the ring 42 is, the closer L1 and W1 are, that is, the closer to 1 the ratio R1=X/Y of the shorter side X and the longer side Y of the rectangle 44, i.e. min(L1, W1)/max(L1, W1) is. However, in case of the ring 52 in FIG. 4, a rectangle 54 is L2 in length on X-axis and W2 in width on Y-axis. Although the ratio of sides R1 is close to 1, the rectangle 54 is not the minimum rectangle surrounding the ring 52 in size, and the ring 52 is not a circle, either. Therefore, the present invention uses a ratio of areas R2=Q/(L*W) to check how the ring 42, 52 deviates from a circle, wherein Q is the area Q, Q' of the maximum brightness area of the ring 42, 52, and L*W is the area of the rectangle surrounding the ring 42, 52. In case of the ring 42 in FIG. 3, the ratio of areas R2=Q1/(L1*W1) is close to 1, so that the ring 42 is close to a circle. On the contrary, in case of the ring 52 in FIG. 4, since the ratio of areas R2=Q2/(L2*W2) is far less than 1, the ring 52 is far from a circle, even if its ratio of sides R1 is close to 1. Therefore, the present invention calculate an image shape corresponding value S for a third parameter (S=R1*R2= [min(L, W)/max(L, W)]*[Q/(L*W)] to measure the deviation of the ring from a circle. Since the rectangle 54 is not the smallest one of the possible rectangles surrounding the ring 52, its ratio of sides R1=L2/W2 is unable to precisely indicate the deviation of the ring from a circle. Thus, among the possible rectangles with four sides in contact with the ring 52, only the smallest one 56 should be utilized (as shown in FIG. 4) for determining the third parameter by referring to the ratio of a shorter side W3 and a longer side L3 of the rectangle 56, i.e. min(L3, W3)/max(L3, W3). Apparently, when the ring 52 deviates from a circle to be an oval, the rectangle 56 deviates accordingly from a square to a flat rectangle. In other words, the ratio of W3 and L3 and the third parameter are far less than 1. In such a manner the deviation of the ring from a circle can be measured.

In addition, the present embodiment calculates a fourth parameter I to represent the light intensity of the lamp 24, which is obtained by calculating the average of a plurality of gray level, that is, the fourth parameter I is the average gray level of the image on the screen 18 (Step 106). The present embodiment uses the semitransparent screen 18 and the filter 34 installed on the image capturing apparatus 20 to reduce the light intensity of the lamp 24 in a predetermined proportion, and the gain of the image capturing apparatus 20 is fixed. Thus, the larger the light intensity of the lamp 24 is, the brighter the image on the screen 18 is, and the larger the gray level of the pixels of the image is. On the contrary, the smaller the light intensity of the lamp 24 is, the darker the image on the screen 18 is, and the smaller the gray level of the pixels of the image is. Therefore, the present embodiment calculates a fourth parameter I which is the average gray level of the image, to represent the light intensity of the lamp 24 (Step 106). Besides, calculating the average light intensity calculated by the conventional integrating sphere to be the fourth parameter also belongs to the range of the present invention.

At last, calculate the characteristic parameter of the lamp 24 by the first parameter D2/D1, the second parameter V, the third parameter S and the fourth parameter I (Step 108). The smaller D2 is, the closer to an ideal position the hot spot is, and the more concentrating the light from the lamp 24 is. In other words, the closer to 1 the value of 1−D2/1 is, the more concentrating the light from the lamp 24 is. And the closer to 1 the third parameter S is, the more uniformly the light from the lamp 24 distributes. Therefore, the uniformity of the lamp 24 relates to the first parameter D2/D1 and the third parameter S. Besides, the larger the second parameter V is, the brighter the light from the lamp 24 is. And the larger the fourth parameter I is, the brighter the image on the screen 18 is, and the brighter the lamp 24 is. In other words, the brightness of the lamp 24 relates to the second parameter V and the fourth parameter I.

In summary, the characteristic parameter can be represented by a value P as follows:

$P = (1 - D2/D1)*V*S*I;$ $V = Q*h;$ $S = R1*R2;$ $R1 = [\min(L, W)/\max(L, W)];$ $R2 = [Q/(L*W)]$ The smaller the first parameter (1−D2/D1) is, the larger the characteristic parameter P is, and the more uniform the light from the lamp is. The larger the second parameter V=Q*/h is, the larger the characteristic parameter P is, and the brighter the light from the lamp is. The closer to 1 the third parameter S is, the larger the characteristic parameter P is, and the more uniform the light from the lamp is. And the larger the fourth parameter I is, the larger the characteristic parameter P is, and the brighter the light from the lamp is. Thus, a larger characteristic parameter P represents a better performance. Therefore when manufacturing the lamp 24, the lamp testing system 10 can be applied in the testing process, and the relating position of the burner 26 and the reflector 28 can be adjusted for a better characteristic parameter.

For instance, when the lamp 24 projects the image 50 as in FIG. 4 on the screen 18, the deviation of the hot spot can be known by calculating the first parameter, so that the relating position of the burner 26 and the reflector 28 can be adjusted in order to have the lamp 24 project the image 40 as in FIG. 3 after calibration. Similarly, a tester can further adjust the relating position of the burner 26 and the reflector 28 according to the other parameters. Moreover, since two lamps with the same light flux do not necessarily have the same characteristics as it is mentioned above, e.g. one of the lamps may project the image 40 in FIG. 3 while the other may project the image 50 in FIG. 4. The manufacturer of the digital projector can test the lamps by the lamp testing system 10 and classify the lamps according to the characteristic parameters measured, in order to install the lamps to proper digital projectors.

In addition, after testing and classification on the lamps 24, the brightness and uniformity of the lamps 24 can be known, so that the lamps 24 can be installed in different lamp sockets according to their characteristics. For instance, in FIG. 4 the image 50 deviates upper-leftwards, so that the lamp 24 in FIG. 4 can be installed in a lamp socket tends lower-rightwards for a better performance. Thus the hot spot of the lamp 24 can be adjusted to a proper position by the lamp socket so that the lamp 24 can project the image 40 as in FIG. 3. In summary, the lamp testing system 10 provides a means for measuring the characteristics of the lamp 24, and the first, the second, the third and the fourth parameter calculated by the image processing program is for rating the characteristics of the lamp 24 to provide meaningful values to the tester.

Please notice that although the first, the second, the third and the fourth parameter are calculated in sequence as shown in Steps 100–106 in FIG. 2, the sequence of the present invention is not limited to that. The sequence of Step 100–106 can be adjusted, and the user can also calculate any single parameter to check the performance of the lamp 24. In this case, the predetermined gray level G of the first, the second, the third and the fourth parameter calculated is not necessary the same. The user can use a first predetermined gray level G1 to define a first light source testing area in order to calculate the first parameter D2/D1. The user can also use a second predetermined gray level G2 to define a second light source testing area in order to calculate the second parameter V. The user can use a third predetermined gray level G3 to define a third light source testing area in order to calculate the third parameter S.

In contrast to the prior art, the lamp testing system uses the aperture to simulate the aperture in the digital projector. When the lamp is turned on and it projects the image onto the screen, the image capturing apparatus captures the image, and then the image processing program processes the image to calculate the first parameter representing the deviation of the hot spot, the second parameter representing the light concentration, the third parameter representing the deviation of the ring from a circle, and the fourth parameter representing the average gray level. Thus, the performance of the lamp can be rated by the first, the second, the third and the fourth parameters, so that the relative position of the burner and the reflector can be adjusted according to the performance.

Those skilled in the art will readily observe that numerous modifications and alterations of the device and the method may be made while retaining the teachings of the invention. Accordingly, the above disclosure should be construed as limited only by the metes and bounds of the appended claims.

What is claimed is:

1. A light source testing method comprising:
providing a light source for generating light;
using an image capturing apparatus for capturing an image with a plurality of pixels according to the light, the image having an image center and an image edge at a distance of D1 from the image center; and
selecting a predetermined gray level G, and defining a brightest area and the light source center as follows:
the brightest area being an area formed by pixels with gray level larger than the predetermined gray level G from the plurality of pixels of the image;
the light source center being the center of the brightest area;
defining the distance between the light source center c and the image center b as D2 to calculate the center deviation D2/D1;
calculating the area Q' of the brightest area;
calculating a maximum gray level GX of the plurality of pixels of the image, and a gray level difference h'=GX−G between the predetermined gray level G and the maximum gray level GX;
calculating a product V'=h'*Q' of the gray level difference h' and the area Q';
calculating a plurality of rectangles surrounding the brightest area with their four sides in contact with the brightest area;
selecting a specific rectangle having a minimum area among the plurality of rectangles, and defining the shorter side of the selected rectangle as X, the longer side as Y;
defining the ratio of side R1, the ratio of area R2, and the S value corresponding to the shape of the light source to detect the uniformity of the light source as follows:

$R1=X/Y;$ $R2=(Q3/(X*Y));$ $S=R1*R2;$ calculating the average gray level I according to the plurality of gray levels of the plurality of pixels; and
evaluating the brightness and uniformity of the light source by calculating a P value as follows;

$P=(1-D2/D1)*V'*S*I.$

2. The method of claim 1 wherein the smaller the center deviation D2/D1 is, the larger the P value is, and the more uniform the light source is.

3. The method of claim 1 wherein the closer to 1 the S value is, the larger the P value is, and the more uniform the light source is.

4. The method of claim 1 wherein the larger V' or I is, the larger the P value is, and the brighter the light source is.

5. A light source testing method comprising:
providing a light source for generating light;
using an image capturing apparatus for capturing an image with a plurality of pixels according to the light;
selecting a first predetermined gray level G1, and defining a first light source testing area and a light source center c as follows:
the first light source testing area being an area formed by pixels with gray level larger than the first predetermined gray level G1 from a plurality of pixels of the image;
the light source center c being the center of the first light source testing area; and
defining the distance between the light source center c and the image center b as D2 to calculate a center deviation D2/D1 in order to detect the uniformity of the light source.

6. A light source testing method comprising:
providing a light source for generating light;
using an image capturing apparatus for capturing an image with a plurality of pixels according to the light;
selecting a second predetermined gray level G2, and calculating the area Q2 of a second light source testing area formed by pixels with gray level larger than the second predetermined gray level G2 of the image;
calculating a maximum gray level GX1, and a gray level difference h=GX1−G2 between the second predetermined gray level G2 and the maximum gray level GX1; and
detecting the brightness of the light source by a product V=h*Q2 of the gray level difference h and the area Q2.

7. A light source testing method comprising:
providing a light source for generating light;
using an image capturing apparatus for capturing an image with a plurality of pixels according to the light;
selecting a third predetermined gray level G3, and defining the area Q3 of a third light source testing area formed by pixels with gray level larger than the third predetermined gray level G3 of the image;
calculating a plurality of rectangles surrounding the third light source testing area with their four sides in contact with the third light source testing area;
selecting a specific rectangle having a minimum area among the plurality of rectangles, and defining the shorter side of the selected rectangle as X, the longer side as Y; and
defining a ratio of side R1, a ratio of area R2, and an S value corresponding to the shape of the light source to detect the uniformity of the light source as follows:

$R1=X/Y;$ $R2=(Q3/(X*Y));$ $S=R1*R2.$

* * * * *